United States Patent
Roberts et al.

(10) Patent No.: US 11,616,229 B2
(45) Date of Patent: Mar. 28, 2023

(54) LITHIUM, NICKEL, MANGANESE MIXED OXIDE COMPOUND AND ELECTRODE COMPRISING THE SAME

(71) Applicant: Dyson Technology Limited, Wiltshire (GB)

(72) Inventors: Matthew Robert Roberts, Oxford (GB); Peter George Bruce, Oxford (GB); Niccolo Guerrini, Oxford (GB); Kun Luo, Tianjin (CN); Rong Hao, Shenzhen (GB)

(73) Assignee: Dyson Technology Limited, Malmesbury (GB)

( * ) Notice: Subject to any disclaimer, the term of this patent is extended or adjusted under 35 U.S.C. 154(b) by 271 days.

(21) Appl. No.: 16/954,966

(22) PCT Filed: Dec. 18, 2018

(86) PCT No.: PCT/GB2018/053660
§ 371 (c)(1),
(2) Date: Jun. 17, 2020

(87) PCT Pub. No.: WO2019/122848
PCT Pub. Date: Jun. 27, 2019

(65) Prior Publication Data
US 2020/0335786 A1   Oct. 22, 2020

(30) Foreign Application Priority Data

Dec. 18, 2017   (GB) ..................................... 1721172

(51) Int. Cl.
*H01B 1/08*   (2006.01)
*H01M 4/525*   (2010.01)
(Continued)

(52) U.S. Cl.
CPC ............ *H01M 4/525* (2013.01); *C01G 53/50* (2013.01); *H01B 1/08* (2013.01); *H01M 4/505* (2013.01);
(Continued)

(58) Field of Classification Search
CPC .......... H01B 1/00; H01B 1/08; H01M 4/525; H01M 4/505; H01M 4/622; C01G 53/50
See application file for complete search history.

(56) References Cited

U.S. PATENT DOCUMENTS 3,761,500 A   9/1973   Thomas
3,993,508 A   11/1976   Erlichman
(Continued)

FOREIGN PATENT DOCUMENTS

CA   2527207   *   8/2013
CN   1404635 A       3/2003
(Continued)

OTHER PUBLICATIONS

Breger et al "High-resolution X-ray diffraction, DIFFaX, NMR and first principles study of disorder in the Li2MnO3—Li[Ni1/2Mn1/2]O2 solid solution", Journal of Solid State Chemistry 178 (2005) 2575-2585.*

(Continued)

*Primary Examiner* — Mark Kopec
(74) *Attorney, Agent, or Firm* — Faegre Drinker Biddle & Reath LLP (57) ABSTRACT

A compound of the general formula: (i) wherein x has a value greater than 0.06 and equal to or less than 0.4. The compound is also formulated into a positive electrode for use in an electrochemical cell.

6 Claims, 4 Drawing Sheets

(51) Int. Cl.
*C01G 53/00* (2006.01)
*H01M 4/505* (2010.01)
*H01M 4/62* (2006.01)
*H01M 10/0525* (2010.01)
*H01M 4/02* (2006.01)

(52) U.S. Cl.
CPC ........... *H01M 4/622* (2013.01); *H01M 4/623* (2013.01); *H01M 4/625* (2013.01); *H01M 10/0525* (2013.01); *C01P 2002/20* (2013.01); *C01P 2002/72* (2013.01); *C01P 2002/77* (2013.01); *C01P 2002/86* (2013.01); *C01P 2006/40* (2013.01); *H01M 2004/028* (2013.01)

(56) References Cited

U.S. PATENT DOCUMENTS

| | | | |
|---|---|---|---|
| 4,047,289 | A | 9/1977 | Wolff |
| 4,288,381 | A | 9/1981 | Dozzi et al. |
| 4,299,986 | A | 11/1981 | Cucinella |
| 5,136,046 | A | 8/1992 | Park et al. |
| 5,250,784 | A | 10/1993 | Muller et al. |
| 5,411,592 | A | 5/1995 | Ovshinsky et al. |
| 5,718,989 | A | 2/1998 | Aoki et al. |
| 6,616,714 | B1 | 9/2003 | Gauthier et al. |
| 7,754,384 | B2 | 7/2010 | Patoux et al. |
| 8,122,250 | B2 | 2/2012 | Haverinen |
| 8,153,301 | B2 | 4/2012 | Jiang |
| 8,546,018 | B2 | 10/2013 | Kajiyama |
| 8,722,250 | B2 | 5/2014 | Park |
| 9,293,766 | B2 | 3/2016 | Liu et al. |
| 9,325,030 | B2 | 4/2016 | Zidan |
| 9,525,173 | B2 | 12/2016 | Kagei et al. |
| 9,575,025 | B2 | 2/2017 | Nakayama et al. |
| 9,593,024 | B2 * | 3/2017 | Thackeray .......... H01M 4/0471 |
| 9,692,084 | B2 | 6/2017 | Yang et al. |
| 9,755,272 | B2 | 9/2017 | Gaben |
| 9,768,450 | B2 | 9/2017 | Song et al. |
| 9,843,041 | B2 | 12/2017 | Lopez |
| 9,893,376 | B2 | 2/2018 | Yang et al. |
| 9,947,916 | B2 | 4/2018 | Oda |
| 9,960,458 | B2 | 5/2018 | Weicker et al. |
| 9,997,774 | B2 | 6/2018 | Hiratsuka |
| 10,199,649 | B2 | 2/2019 | Beck et al. |
| 10,290,869 | B2 | 5/2019 | Axelbaum |
| 10,629,902 | B2 | 4/2020 | Yu |
| 2002/0110733 | A1 | 8/2002 | Johnson |
| 2003/0129495 | A1 | 7/2003 | Yamato et al. |
| 2003/0162086 | A1 | 8/2003 | Longhi, Jr. et al. |
| 2004/0091779 | A1 | 5/2004 | Kang et al. |
| 2005/0014065 | A1 | 1/2005 | Jung et al. |
| 2005/0112466 | A1 | 5/2005 | Jordy et al. |
| 2006/0160261 | A1 | 7/2006 | Sheats |
| 2007/0238019 | A1 | 10/2007 | Laurent et al. |
| 2008/0263855 | A1 | 10/2008 | Li et al. |
| 2008/0264478 | A1 | 10/2008 | Ahn et al. |
| 2009/0148764 | A1 | 6/2009 | Kwak et al. |
| 2010/0108939 | A1 | 5/2010 | Breger et al. |
| 2010/0233542 | A1 | 9/2010 | Endo et al. |
| 2010/0248033 | A1 | 9/2010 | Kumar et al. |
| 2011/0126402 | A1 | 6/2011 | Kwak et al. |
| 2011/0129594 | A1 | 6/2011 | Kwak et al. |
| 2011/0168944 | A1 | 7/2011 | Chang et al. |
| 2011/0291043 | A1 | 12/2011 | Wilcox et al. |
| 2011/0294015 | A1 | 12/2011 | Pirk et al. |
| 2011/0311883 | A1 | 12/2011 | Oukassi et al. |
| 2012/0183855 | A1 | 7/2012 | Wohlfahrt-Mehrens et al. |
| 2012/0225199 | A1 | 9/2012 | Muthu et al. |
| 2012/0270114 | A1 | 10/2012 | Reynolds et al. |
| 2012/0312474 | A1 | 12/2012 | Kwak et al. |
| 2012/0321815 | A1 | 12/2012 | Song et al. |
| 2013/0040201 | A1 | 2/2013 | Manthiram |
| 2013/0160283 | A1 | 6/2013 | Wu |
| 2013/0260248 | A1 | 10/2013 | Seki et al. |
| 2013/0298387 | A1 | 11/2013 | Kobier et al. |
| 2014/0007418 | A1 | 1/2014 | Song et al. |
| 2014/0120397 | A1 | 5/2014 | Kim et al. |
| 2014/0154581 | A1 | 6/2014 | Kawasato et al. |
| 2014/0178748 | A1 | 6/2014 | Chernyshov et al. |
| 2014/0227609 | A1 | 8/2014 | Frey et al. |
| 2014/0242463 | A1 | 8/2014 | Song |
| 2014/0255603 | A1 | 9/2014 | Xiao et al. |
| 2015/0010822 | A1 | 1/2015 | Nakahara et al. |
| 2015/0010872 | A1 | 1/2015 | Schindler et al. |
| 2015/0050522 | A1 | 2/2015 | Manthiram et al. |
| 2015/0064558 | A1 | 3/2015 | Seki et al. |
| 2015/0102530 | A1 | 4/2015 | Wallace et al. |
| 2015/0180031 | A1 | 6/2015 | Thackeray et al. |
| 2015/0188186 | A1 | 7/2015 | Bedjaoui et al. |
| 2015/0280201 | A1 | 10/2015 | Bhardwaj |
| 2016/0164088 | A1 | 6/2016 | Peralta et al. |
| 2016/0164092 | A1 | 6/2016 | Stottlemyer |
| 2016/0218362 | A1 | 7/2016 | Kagei et al. |
| 2016/0218364 | A1 | 7/2016 | Sakai et al. |
| 2016/0254539 | A1 | 9/2016 | Kagei et al. |
| 2016/0294010 | A1 | 10/2016 | Herb et al. |
| 2016/0372783 | A1 | 12/2016 | Min et al. |
| 2017/0133678 | A1 | 5/2017 | Ozoemena et al. |
| 2019/0044182 | A1 | 2/2019 | Maeda et al. |
| 2019/0115627 | A1 | 4/2019 | Rendall |
| 2019/0334171 | A1 | 10/2019 | Ozoemena |
| 2020/0220221 | A1 | 7/2020 | Keyzer et al. |
| 2020/0280099 | A1 | 9/2020 | Keyzer et al. |
| 2020/0377376 | A1 | 12/2020 | Roberts et al. |
| 2020/0381718 | A1 | 12/2020 | Roberts et al. |
| 2020/0381724 | A1 * | 12/2020 | Roberts ................. H01M 4/623 |
| 2020/0381725 | A1 * | 12/2020 | Roberts ................. H01M 4/525 |
| 2020/0381726 | A1 | 12/2020 | Roberts et al. |

FOREIGN PATENT DOCUMENTS

| | | |
|---|---|---|
| CN | 1458706 A | 11/2003 |
| CN | 1464573 A | 12/2003 |
| CN | 101128941 A | 2/2008 |
| CN | 101562245 A | 10/2009 |
| CN | 101694876 A | 4/2010 |
| CN | 101855770 A | 10/2010 |
| CN | 102054986 A | 5/2011 |
| CN | 102074700 A | 5/2011 |
| CN | 102881873 A | 1/2013 |
| CN | 103035900 A | 4/2013 |
| CN | 103311513 A | 9/2013 |
| CN | 103545519 A | 1/2014 |
| CN | 103887562 A | 6/2014 |
| CN | 105742607 A | 7/2016 |
| CN | 105810934 A | 7/2016 |
| CN | 103943844 B | 8/2016 |
| CN | 106410186 A | 2/2017 |
| CN | 104241633 B | 9/2017 |
| DE | 4227720 A1 | 4/1993 |
| EP | 1189296 A2 | 3/2002 |
| EP | 2746288 A1 | 6/2014 |
| EP | 2763219 A2 | 8/2014 |
| EP | 2827430 A1 | 1/2015 |
| EP | 3093272 A1 | 11/2016 |
| GB | 1402544 A | 8/1975 |
| GB | 2128604 A | 5/1984 |
| JP | 45-035555 | 11/1970 |
| JP | 57-96472 A | 6/1982 |
| JP | S64-21870 A | 1/1989 |
| JP | H4-269721 A | 9/1992 |
| JP | 09-237631 A | 9/1997 |
| JP | 2000-149911 A | 5/2000 |
| JP | 2002-343342 A | 11/2002 |
| JP | 2003-226955 A | 8/2003 |
| JP | 2005-044801 A | 2/2005 |
| JP | 2005-100947 A | 4/2005 |
| JP | 2005-150093 A | 6/2005 |
| JP | 2005-150102 A | 6/2005 |
| JP | 2006-294597 A | 10/2006 |
| JP | 2007-503102 A | 2/2007 |
| JP | 2009-182273 A | 8/2009 |
| JP | 2009-246236 A | 10/2009 |
| JP | 2009-544141 A | 12/2009 |

(56) References Cited

FOREIGN PATENT DOCUMENTS

| | | |
|---|---|---|
| JP | 2010-251075 A | 11/2010 |
| JP | 2011-108603 A | 6/2011 |
| JP | 2013-506945 A | 2/2013 |
| JP | 2014-146458 A | 8/2014 |
| JP | 2014-529176 A | 10/2014 |
| JP | 2014-531718 A | 11/2014 |
| JP | 2017-521848 A | 8/2017 |
| KR | 10-2014-0081468 A | 7/2014 |
| KR | 10-2016-0091172 A | 8/2016 |
| KR | 10-2017-0008540 A | 1/2017 |
| KR | 10-2017-0025874 A | 3/2017 |
| WO | 2009/055529 A1 | 4/2009 |
| WO | 2010/036723 A1 | 4/2010 |
| WO | 2011/039132 A1 | 4/2011 |
| WO | 2011/052607 A1 | 5/2011 |
| WO | 2012/065767 A1 | 5/2012 |
| WO | 2013/021955 A1 | 2/2013 |
| WO | 2013/035519 A1 | 3/2013 |
| WO | 2013/118659 A1 | 8/2013 |
| WO | 2013/146723 A1 | 10/2013 |
| WO | 2015/007586 A1 | 1/2015 |
| WO | 2015/053357 A1 | 4/2015 |
| WO | 2015/107194 A1 | 7/2015 |
| WO | 2016/001884 A1 | 1/2016 |
| WO | 2016/210419 A1 | 12/2016 |
| WO | 2017/047280 A1 | 3/2017 |
| WO | 2017/087403 A1 | 5/2017 |

OTHER PUBLICATIONS

Jiang et al "Electrochemical and structural study of the layered, "Li-excess" lithium-ion battery electrode material Li[Li1/9Ni1/3Mn5/9]O2", Chem. Mater. 2009, 21, 2733-2745.*

Park et al "Li[NixLi(1/3-2x/3)Mn(2/3-x/3)]O2 compounds . . . ", Journal of Power Sources 129 (2004) 288-295.*

Lu et al "Synthesis, structure, and the electrochemical behavior of Li[NixLi1/3-2x/3Mn2/3-x/3]O2", Journal of the Electrochemical Society, 149, (6) A778-A791.*

Office Action received for Japanese Patent Application No. 2020552156 dated Sep. 7, 2021, 12 pages (6 pages of English Translation and 6 pages of Original Document).

Notification of Reason(S) for Refusal received for Korean Application No. 10-2020-7018773, dated Sep. 23, 2021, 12 pages (6 pages of English Translation and 6 pages of Original Document).

Office Action received for Japanese Patent Application No. 2020-552161, dated Sep. 7, 2021, 4 pages (2 pages of English Translation and 2 pages of Original Document).

Office Action received for Japanese Patent Application No. 2020-552159, dated Sep. 7, 2021, 4 pages (2 pages of English Translation and 2 pages of Original Document).

Office Action received for Korean Patent Application No. 10-2020-7018774, dated Sep. 23, 2021, 10 pages (5 pages of English Translation and 5 pages of Original Document).

Birrozzi et al. (2016). "Beneficial effect of propane sultone and tris(trimethylsilyl) borate as electrolyte additives on the cycling stability of the lithium rich nickel manganese cobalt (NMC) oxide," Journal of Power Sources 325:525-533.

Cucinella et al. (1982). "Calcium Alkoxyalanates I. Synthesis and Physicochemical Characterization," Journal of Organometallic Chemistry 224(1): 1-12.

Hudson et al. (2007). "Studies on Synthesis and Dehydrogenation Behavior of Magnesium Alanate and Magnesium-Sodium Alanate Mixture," International Journal of Hydrogen Energy 32(18): 4933-4938.

International Search Report and Written Opinion dated Feb. 14, 2019, directed to International Application No. PCT/GB2018/053660; 13 pages.

Lu et al. (Apr. 2002). "Synthesis, Structure, and Electrochemical Behavior of Li[NixLi(1/3-2x/3)Mn(2/3-x/3)]O2," Journal of the Electrochemical Society, 149(6): A778-A791.

Mehrotra et al. (Jan. 1978). "Preparation and Characterization of Some Volatile Double Isopropoxides of Aluminium with Alkaline Earth Metals," Inorganica Chemica Acta 29:131-136.

Metz et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.

Park et al. (Apr. 2004). "Structural investigation and electrochemical behaviour of Li[NixLi(1/3-2x/3)Mn(2/3-x/3)]O2 compounds by a simple combustion method," Journal of Power Sources 129: 288-295.

Park et al. (May 2010). "Suppression of O2 evolution from oxide cathode for lithium-ion batteries: VOx-impregnated 0.5Li2MnO3—0.5LiNi0.4Co0.2Mn0.4O2 cathode," Chemical Communications, 46(23): 4190-4192.

Search Report dated Jun. 28, 2018, directed to GB Application No. 1721172.3; 2 pages.

Thackeray et al. (Aug. 2006). "Comments on the structural complexity of lithium-rich Li1+xM1-xO2 electrodes (M +Mn, Ni, Co) for lithium batteries," Electrochemistry Communications 8(9):1531-1538.

Turova et al. (1977). "Hydrolysis and Alcoholysis of Alkali Metal Aluminium Hydrides," Inorganica Chimica Acta, 21: 157-161.

Wu et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.

Yasushi et al. (Nov. 16, 1984) "CAS No. [32843-22-4] Aluminate(1-), tetrakis(diphenylaminato)-, magnesium," (2 pages).

Meese-Marktscheffel et al., "Magnesium-aluminum alkoxides: the synthesis of Mg[Al(OR)4]2 (R=Busec and Ph), structure of (thf)2Mg[(μ-OPh)2Al (OPh))2]2, and dynamic NMR of Mg[Al(OBusec)4]2", Polyhedron, 1994, vol. 13, No. 6-7, pp. 1045-1050.

Office Action received for Japanese Application No. 2020-515116, dated Oct. 12, 2021, 4 pages (2 pages of English Translation and 2 pages of Original Document).

Govil et al., "Some Double Ethoxides of Alkaline Earth Metals with Aluminium", Synthesis and Reactivity in Inorganic and Metal-Organic Chemistry, vol. 5, No. 4, 1975, pp. 267-277.

International Search Report and Written Opinion received for PCT Patent Application No. PCT/GB2018/052537, dated Dec. 19, 2018, 17 pages.

International Search Report and Written Opinion received for PCT Patent Application No. PCT/GB2018/052538, dated Oct. 29, 2018, 11 pages.

International Search Report and Written Opinion received for PCT Patent Application No. PCT/GB2018/053655, dated Apr. 8, 2019, 15 pages.

International Search Report and Written Opinion received for PCT Patent Application No. PCT/GB2018/053656, dated Feb. 15, 2019, 11 pages.

International Search Report and Written Opinion received for PCT Patent Application No. PCT/GB2018/053657, dated Apr. 15, 2019, 14 pages.

International Search Report and Written Opinion received for PCT Patent Application No. PCT/GB2018/053659, dated Apr. 8, 2019, 16 pages.

International Search Report and Written Opinion received for PCT Patent Application No. PCT/GB2018/053663, dated Sep. 15, 2019, 10 pages.

Office Action received for Japanese Patent Application No. 2020-552157, dated Jun. 21, 2021, 10 pages (5 pages of English Translation and 5 pages of Original Document).

Office Action received for Japanese Patent Application No. 2020-552160, dated Jul. 5, 2021, 5 pages (2 pages of English Translation and 3 pages of Original Document).

Office Action received for Korean Patent Application No. 10-2020-7010108, dated Jul. 28, 2021, 10 pages (5 pages of English Translation and 5 pages of Original Document).

Office Action received for Korean Patent Application No. 10-2020-7010109, dated Jul. 28, 2021, 10 pages (5 pages of English Translation and 5 pages of Original Document).

(56) References Cited

OTHER PUBLICATIONS

Search Report dated Jun. 28, 2018, directed to GB Application 1721179.8; 2 pages.
Search Report dated Jun. 28, 2018, directed to GB Application No. 1721177.2; 2 pages.
Search Report dated Jun. 28, 2018, directed to GB Application No. 1721178.0; 2 pages.
Search Report dated Jun. 28, 2018, directed to GB Application No. 1721180.6; 2 pages.
Search Report dated May 30, 2018, directed to GB Application No. 1714770.3; 2 pages.
Peretich, A.L., Amenta, D.S., Gilje, J.W. et al. "Crystal Structure of [Me2NCH(O)]2Mg[(Ij-OPri)2Al(OPri)2]2". J Chem Crystallogr40, 716-719 (2010). https://doi.org/10.1007/s10870-010-9783-x.
Lee et al., "High capacity Li[Li0.2Ni0.2Mn0.6]O2 cathode materials via a carbonate co-precipitation method," Journal of Power Sources, vol. 162, No. 2, Sep. 12, 2006, pp. 1346-1350.
Office Action received for Chinese Patent Application No. 201880081264.0, dated Feb. 7, 2022, 19 pages (11 pages of English Translation and 8 pages of Original Document).
Office Action received for Chinese Patent Application No. 201880081413.3, dated Mar. 15, 2022, 17 pages (10 pages of English Translation and 7 pages of Original Document).
Office Action received for Japanese Patent Application No. 2020-552157, dated Jan. 25, 2022, 5 pages (2 pages of English Translation and 3 pages of Original Document).
Park et al., "The Effects of Ni Doping on the Performance of O3-Lithium Manganese Oxide Material", Korean J. Chem. Eng., vol. 21, No. 5, 2004, pp. 983-988.
Jiang et al., "Electrochemical and thermal studies of Li[NixLi(1/3-2x/3)Mn(2/3-x/3)]O2 (x=1/12, 1/4, 5/12, and 1/2)", Electrochemica Acta, vol. 50, 2005, pp. 4778-4783.
Office Action received for Chinese Patent Application No. 201880081346.5, dated Jan. 27, 2022, 19 pages (11 pages of English Translation and 8 pages of Original Document).
Office Action received for Korean Patent Application No. 10-2020-7018752, dated Nov. 16, 2021, 10 pages (5 pages of English Translation and 5 pages of Original Document).
Synthesis and performance studies of lithium-rich cathode materials Li[Li(1-x)/3Ni2x/3Mn(2-x)/3]O2 and Li[Li(1-x)/3NixMn(2-2x)/3]O2, Tiantian WU, China Master's Theses Full-text Database: Engineering Technology vol. II, No. 7.
Yang et al., "Porous 0.2Li2MnO3-0.8LiNi0.5Mn0.5O2 nanorods as cathode materials for lithium-ion batteries", ESI for J. Mater. Chem. A, vol. 2, 2013, pp. 5.
Zhang et al., "Synthesis and electrochemistry of layered 0.6LiNi0.5Mn0.5O2•xLi2MnO3•yLiCoO2 (x+y=0.4) cathode materials", Materials Letters, vol. 58, 2004, pp. 3197-3200.
Kim et al.; "Synthesis and electrochemical behavior of Li[Li0.1Ni0.35-x/2CoxMn0.55-x/2]O2 cathode materials"; Solid State Ionics 164, pp. 43-49. (Year: 2003).
Kim et al.; ("Electrochemical properties of Li[Li(1-x)/3CoxMn(2-2x)/3]O2 (0<x<1) solid solutions prepared by poly-vinyl alcohol method"; Electrochemistry Communications 9, pp. 103-108. (Year: 2007).
Sun et al.; "The preparation and electrochemical performance of solid solutions LiCoO2—Li2MnO3 as cathode materials for lithium ion batteries"; Electrochimica Acta 51, pp. 5581-5586. (Year: 2006).
Thackeray et al. "Li2MnO3-stabilized LiMO2 (M=Mn, Ni, Co) electrodes for lithium-ion batteries"; J. of Materials Chemistry, vol. 17, No. 30, pp. 3053-3272. (Year: 2007).
Xiang et al.; "Understanding the Influence of Composition and Synthesis Temperature on Oxygen Loss, Reversible Capacity, and Electrochemical Behavior of xLi2MnO3 (1-x)LiCoO2 Cathodes in the First Cycle"; J. Phys. Chem. 118, pp. 23553-23558. (Year: 2014).

\* cited by examiner

LITHIUM, NICKEL, MANGANESE MIXED OXIDE COMPOUND AND ELECTRODE COMPRISING THE SAME

REFERENCE TO RELATED APPLICATIONS

This application is a national stage application under 35 U.S.C. 371 of International Application No. PCT/GB2018/053660, filed Dec. 18, 2018, which claims the priority of United Kingdom Application No. 1721172.3, filed Dec. 18, 2017, the entire contents of each of which are incorporated herein by reference.

FIELD OF THE DISCLOSURE

The present invention relates to a set of electroactive cathode compounds. More specifically the present invention relates to a set of high capacity lithium-rich NM compounds.

BACKGROUND OF THE DISCLOSURE

Conventional lithium ion batteries are limited in performance by the capacity of the material used to make the positive electrode (cathode). Lithium rich blends of cathode materials containing blends of nickel manganese cobalt oxide offer a trade-off between safety and energy density. It is understood that charge is stored in the transition metal cations within such cathode materials. It has been suggested that the capacity, and therefore energy density, of cathode materials could be significantly increased if charge could be stored on anions (for example oxygen) reducing the need for such high amounts of heavy transition metal ions. However, a challenge remains to provide a material that can rely on the redox chemistries of both the anions and cations to store charge, and withstand charge/discharge cycles without compromising the safety of the material, or causing undesired redox reactions which would break down the material.

SUMMARY OF THE DISCLOSURE

In a first aspect, the present invention provides a compound of the general formula:

wherein x has a value greater than 0.06 and less equal to or less than 0.4.

It has been found that a compound with an improved capacity can be achieved by reducing the amount of excess lithium and increasing the amount of nickel. The particular compound as defined above exhibits a significantly large increase in capacity due to the degree of oxidation of nickel and also the oxidation of the oxide ions within the lattice. Without wishing to be bound by theory, it is understood that the presence of a particular amount of nickel substitution enables oxygen redox activity and thereby improves the electrochemical capacity of the material.

In addition, the compounds of the present invention exhibit improved stability during electrochemical cycling when compared to the transition metal substituted NMC lithium rich materials of the prior art. The evolution of molecular oxygen is ubiquitous with third row lithium-rich materials transition metal oxides where lithium has been exchanged for some of the transition metal ions ($Li_{1+x}M_{1-x}O_2$, where M is Ti, V, Cr, Mn, Fe, Co, Ni, Cu or Zn). These materials generally rely on oxygen redox to improve their charge capacity properties. Homogenous materials can suffer from molecular oxygen escaping from the crystal structure during cycling due to redox of the oxide anion. In turn, this reduces the capacity and useful lifetime of the material. However, the material of the present invention has improved capacity which is maintained over numerous cycles.

It is understood that when the charge imbalance caused by the removal of a lithium ion is balanced by the removal of an electron from the oxygen anion the resulting oxygen anion is unstable which results in undesired redox reactions and the evolution of molecular oxygen gas during charge cycling. Without wishing to be bound by theory, it is understood that the specific nickel content in the material relative to the lithium content avoids under-bonding within the lattice such that each oxygen anion is still bonded to ~3 cations. A potential solution to this problem might be to encapsulate the cathode layer or part of the cell in a gas impermeable membrane. However, this would add parasitic mass to the cell, thereby reducing the energy density of the resulting battery. However, the chemical approach of the present invention tunes the structure of the lattice using specific amounts of transition metals reduces the generation of oxygen gas from the material without the need to add layers to the cathode material or resulting battery cell.

In examples, x (i.e. the nickel content) is equal to or greater than 0.12. x may be equal to or greater than 0.2. It has been demonstrated that capacity of the material is significantly improved when x is equal to or is greater than 0.12, and is further improve when the value of x is equal to 0.2. In addition x may be equal to or less than 0.4. It is understood that the capacity of the material declines to expected levels above this threshold value of 0.4. It has been demonstrated that improved capacity is achieved when x is 0.3. More specifically, the value of x could be said to be greater than 0.06 and equal to or less than 0.4. More specifically, the value of x could be said to be equal to or greater than 0.12 and equal to or less than 0.4. Materials within this broad range show an improved capacity. In further examples of improved materials within this broad range, the value of x may be greater than 0.06 and equal to or less than 0.12.

In further examples, the range of x may be a greater than 0.2. It has been demonstrated that material with a stoichiometric nickel content of above 0.2 has the surprising benefit of reducing the amount of molecular oxygen gas evolved during a charge/discharge cycle as well as having an improved charge capacity. More particularly, this range may be defined as x being greater than 0.2 and equal to or less than 0.4. Even more particularly this range could be defined as x being equal to or greater than 0.3 equal to or less than 0.4. Most particularly, x has a value of either 0.3 or 0.4.

The compound may be defined as having a layered structure. Typically layered structures have been shown to have the highest energy density. When in the layered form, the material can be further defined using the general formula $aLi_2MnO_3 \cdot (1-a)LiNi_{0.5}Mn_{0.5}O_2$ such that a may be less than 0.88, a may also be equal to or greater than 0.2. More particularly, a is equal or greater than 0.2 and less than 0.88. Even more particularly, a is equal or greater than 0.2 and equal to or less than 0.76. Specifically the material may be $0.4Li_2MnO_3 \cdot 0.6LiNi_{0.5}Mn_{0.5}O_2$, or the material may be $0.2Li_2MnO_3 \cdot 0.8LiNi_{0.5}Mn_{0.5}O_2$. These particular layered structures exhibit improved capacity and a higher degree of stability during a charge/discharge cycle. More specifically, the amount of gas evolved from the layered material during a charge/discharge cycle is reduced.

In a second aspect, the present invention provides an electrode comprising the compound of the first aspect. The electrode may comprise 3 fractions. The first is the compound of the present invention as previously described (in a variety of mass percentages from 60-98%, however, typically 70, 75, 80, 90 and 95%). The second fraction of the electrode comprises electroactive additives such as carbon, for example, Super P® and Carbon black, which comprises 60-80% of the mass fraction remaining excluding the first fraction. The third fraction is typically a polymeric binder such as PVDF, PTFE, NaCMC and NaAlginate. In some case additional fractions may be included and the overall percentages may change. The overall electrochemical performance of the cathode material can be improved by the introduction of electroactive additives, and the structural properties of the resulting cathode can also be improved by adding material that improves cohesion of the cathode material and adhesion of the material to particular substrates.

In a third aspect, the present invention provides an electrochemical cell comprising a positive electrode according to the description above, an electrolyte and a negative electrode (anode).

BRIEF DESCRIPTION OF THE FIGURES

In order that the present invention may be more readily understood, embodiments of the invention will now be described, by way of example, with reference to the accompanying Figures, in which.

DETAILED DESCRIPTION OF THE DISCLOSURE

The present invention will now be illustrated with reference to the following examples.

Example 1—Synthesis of the Nickel Substituted Lithium Rich Materials

The Formaldehyde-Resorcinol sol gel synthetic route was employed to synthesise materials with general formula $$Li_{\left(\frac{4}{3}-\frac{2x}{3}\right)}Ni_xMn_{\left(\frac{2}{3}-\frac{x}{3}\right)}O_2$$

with x=0, 0.06, 0.12, 0.2, 0.3 and 0.4 all the reagents ratios were calculated in order to obtain 0.01 mol of the final product.

Stoichiometric amounts of $CH_3COOLi\cdot 2H_2O$ (98.0%, Sigma Aldrich®), $(CH_3COO)_2Mn\cdot 4H_2O$ (>99.0%, Sigma Aldrich®) and $(CH_3COO)_2Ni\cdot 4H_2O$ (99.0% Sigma Aldrich®) were dissolved in 50 mL of water with 0.25 mmol of $CH_3COOLi\cdot 2H_2O$ (99.0%, Sigma Aldrich®) corresponding to 5% moles of lithium with respect to the 0.01 moles of synthesized material. At the same time 0.1 mol of resorcinol (99.0%, Sigma Aldrich®) was dissolved in 0.15 mol of formaldehyde (36.5% w/w solution in water, Fluka®). Once all the reagents were completely dissolved in their respective solvents, the two solutions were mixed and the mixture was vigorously stirred for one hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

Example 2—Structural Analysis and Characterisation of the Nickel Substituted Lithium Rich Materials The materials according to Example 1 were examined with the two techniques: Powder X-Ray Diffraction (PXRD) which was carried out utilising a Rigaku SmartLab® equipped with a 9 kW Cu rotating anode; and MAS-NMR spectra were collected on the materials with a Bruker Avance III 400WD magnet.

Figure 1:
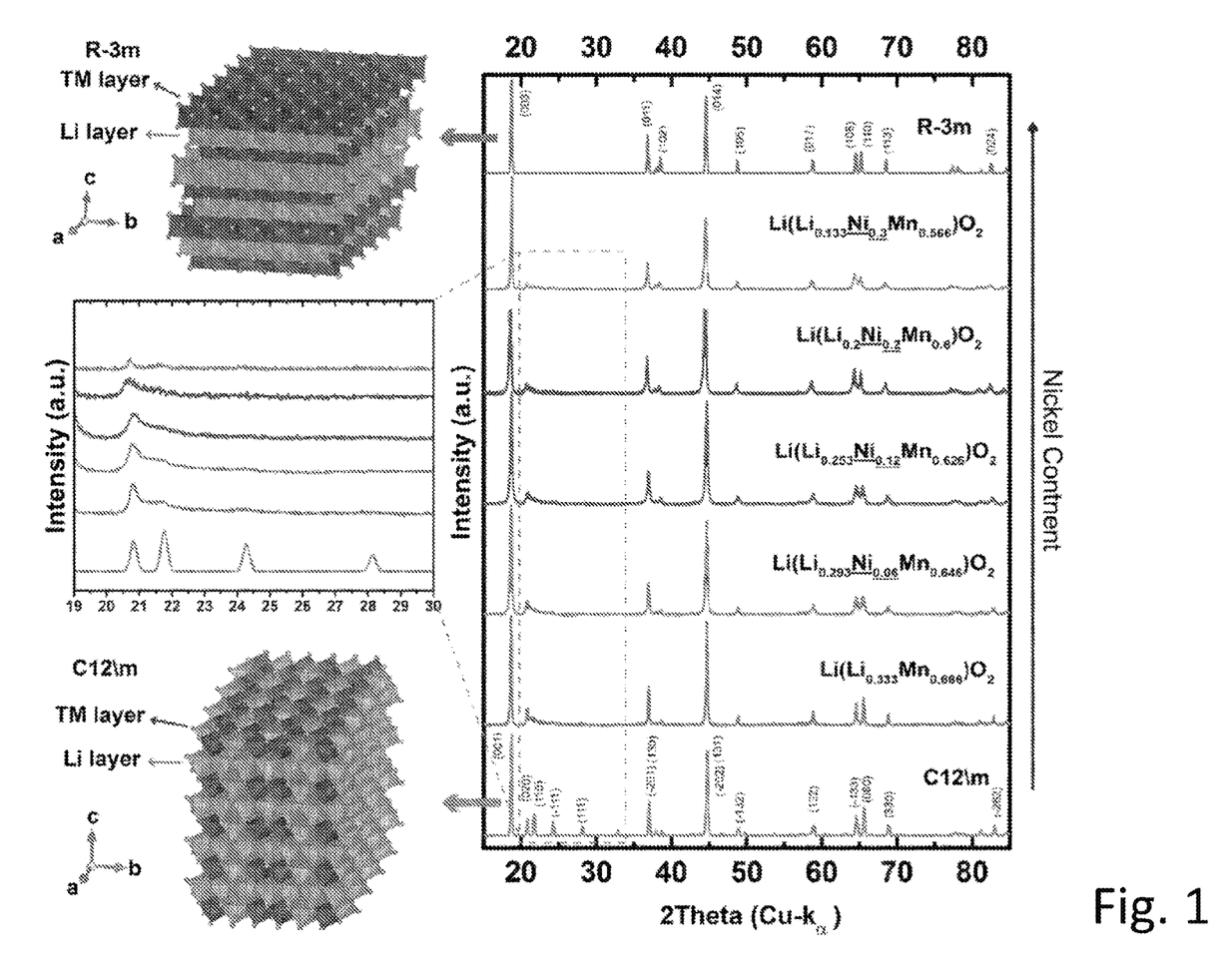
FIG. 1 shows powder X-ray Diffraction patterns of the synthesised materials in accordance with Example 1 compared with the calculated patterns of the C12/m and R-3m symmetry lattice shown at the bottom and top of the figure respectively.

FIG. 1 shows in the right panel: Powder X-ray Diffraction patterns of the synthesised materials compared with the calculated patterns of the C12/m and R-3m symmetry lattice shown at the bottom and top of the figure respectively. On the left-hand side the structures for the C12/m and R-3m are reported. It is possible to observe the presence of transition metal ordering around lithium in the transition metal layer for the structure with C12/m symmetry. The enlargement shows the details of the reflections associated with the cation ordering in the transition metal layer that is lost as the nickel content increases.

All of the patterns appear to show the major peaks consistent with a close-packed layered structure such as $LiTMO_2$ with a R-3m space group. Additional peaks are observed in the range 20-30 2Theta degrees which cannot be assigned to the R-3m space group highlighted in the expanded cut out of the figure. The order derives from the atomic radii and charge density differences between $Li^+$ (0.59 Å), $Ni^{+2}$ (0.69 Å) and $Mn^{4+}$ (0.83 Å) and appears the strongest in the structures of the low nickel doped oxides. In the $Li_2MnO_3$ end member the 2:1 ratio of Li:Mn allows for the formation of a perfect honeycomb and therefore has a near perfect fit to the C12/m spacegroup.

As Nickel is substituted into the material the long range in-layer ordering is progressively lost. This is mainly due to the substitution of 1 $Mn^{+4}$ and 2 $Li^+$ for 3 $Ni^{+2}$ to maintain the charge balance. Since $Ni^{+2}$ and $Li^+$ have a similar atomic radius in comparison to $Mn^{+4}$ the $Ni^{+2}$ will preferentially occupy lithium sites. Since the differential scattering cross section for X-rays of nickel and manganese are very close the ordering of the ions becomes less easy to resolve with X-rays and the peaks in the 20-30 degree range are lost. No presence of extra-peaks due to impurities was observed.

Figure 2:
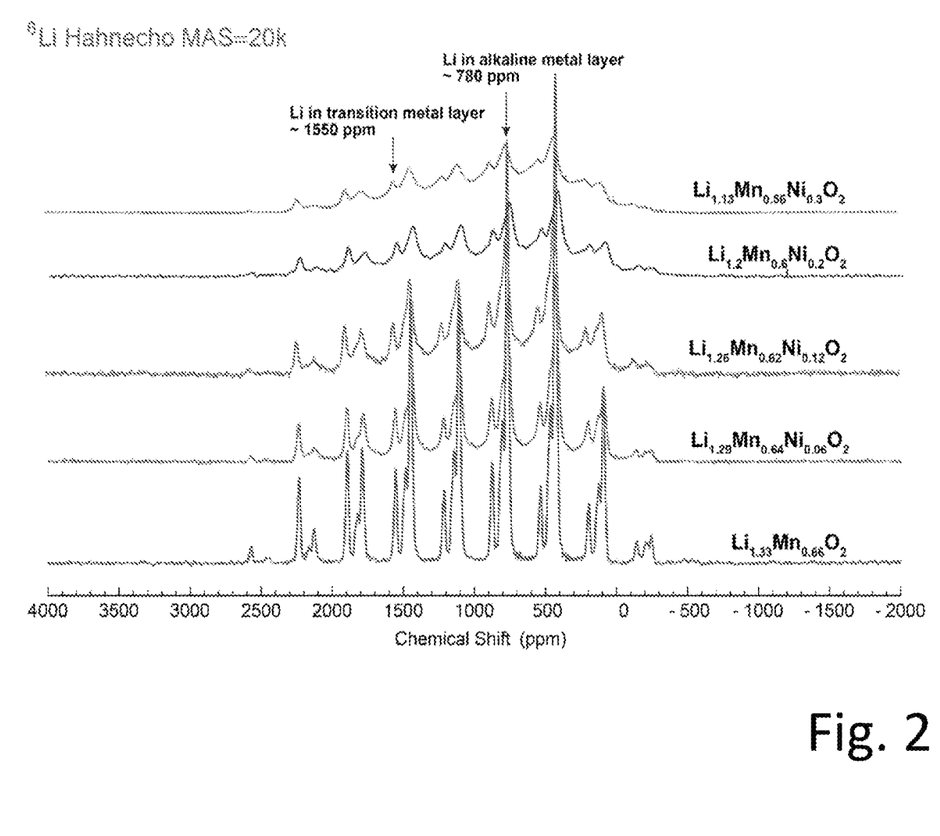
FIG. 2 shows $^6$Li MAS-NMR spectra collected on synthesised materials in accordance with Example 1. The spectra are presented in a stacked fashion with increasing nickel doping going from bottom up.

MAS-NMR spectra were collected for the NMR-active isotope $^6$Li on the whole series of materials. The normalized spectra in FIG. 2 show the presence of two signals, centered at 1550 and 780 ppm, corresponding to the two sites for lithium ions in the structure. The resonance centred at 1550 ppm is attributed to lithium belonging to $[LiMn_6]$ and $[LiMn_5Ni]/[LiMn_5Li]$ configurations, within the transition metal layer. On the other hand, the resonance at 780 ppm is due to lithium in the lithium layer.

A progressive loss of sharpness can be observed as the nickel content is increased although the chemical shift (i.e.

the peaks positions) remains the same for all the materials. This result could be explained through two main phenomena: the generation of new local environments for lithium as nickel is progressively substituted to lithium and manganese in the lattice; and/or a higher concentration of stacking faults in the materials with high nickel content. In both cases the long-range order is broken leading to a progressive broadening of the NMR resonances.

Example 3—Electrochemical Analysis of the Nickel Substituted Lithium Rich Materials The materials according to Example 1 were characterised electrochemically through galvanostatic cycling performed with a BioLogic VMP3 and a Maccor 4600 series potentiostats. All the samples were assembled into stainless steel coincells against metallic lithium and cycled between 2 and 4.8 V vs. Li$^+$/Li for 100 cycles at a current rate of 50 mAg-1. The electrolyte employed was LP30 (a 1M solution of LiPF6 in 1:1 w/w ratio of EC:DMC).

Figure 3:
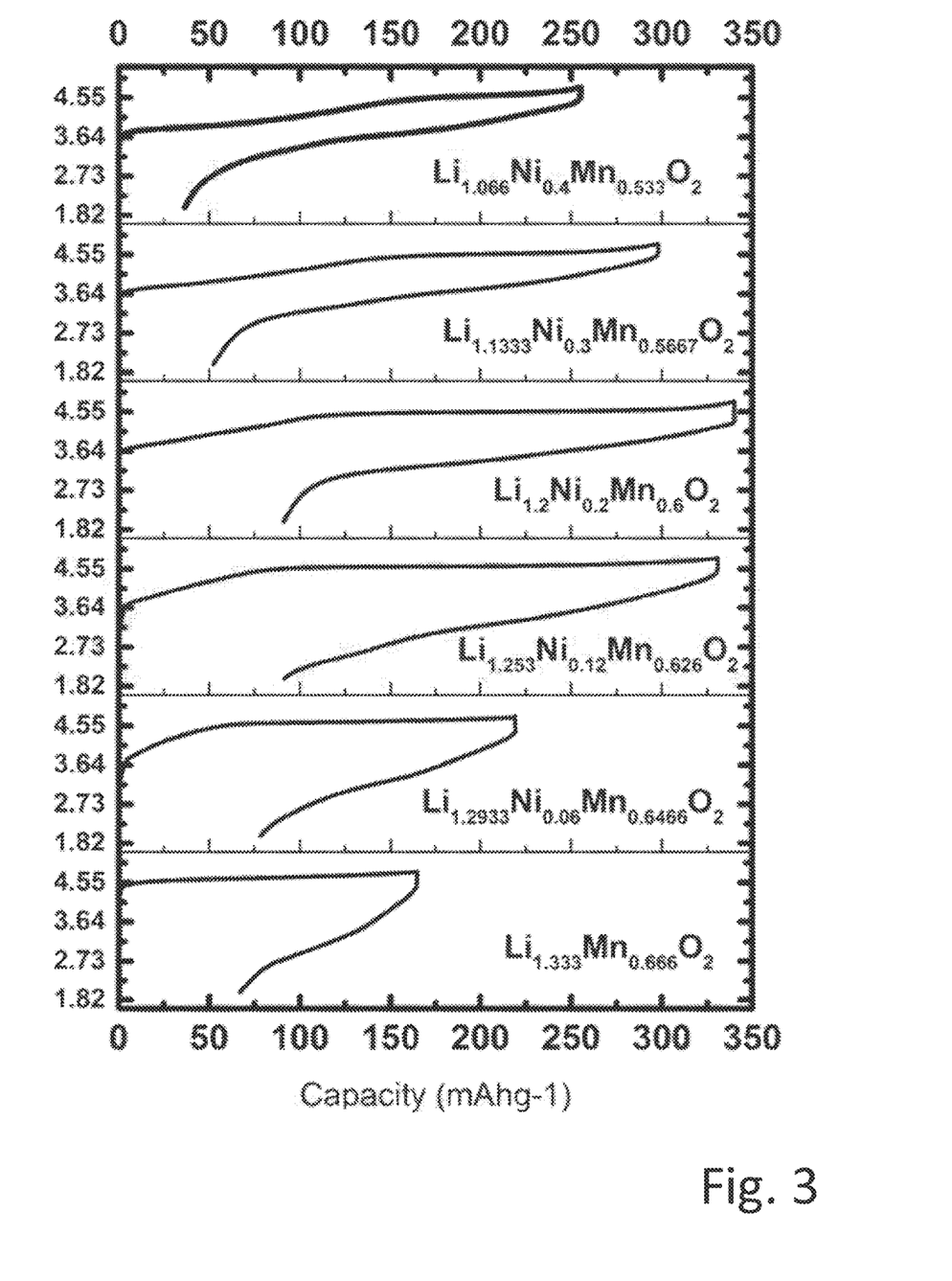
FIG. 3 shows first cycle galvanostatic load curves for the synthesised materials in accordance with Example 1.

FIG. 3 shows the potential curves during the charge and subsequent discharge of the first cycle for each material according to Example 1. All the samples present a high voltage plateau of different lengths centred on 4.5 V vs. Li$^+$/Li$^0$, whereas the presence of a sloped region at the beginning of the charge progressively increases in length with the amount of nickel doping. The extension of this region may be attributed to the oxidation of nickel from Ni$^{+2}$ toward Ni$^{+4}$. appears to be in good agreement with the amount of lithium (i.e. charge) that would be extracted accounting for solely the nickel redox activity. Hence, as expected, Li$_2$MnO$_3$ does not show any pre-plateau region whilst the x=0.3 doped oxide presents more than 150 mAhg$^{-1}$.

During the first discharge, none of the materials show the presence of a reversible plateau, indicating a difference in the thermodynamic pathways followed during the extraction (charge) and insertion (discharge) of lithium ions from/in the lattice of each sample.

For all the material according to Example 1 the first cycle presents the lowest coulombic efficiency value due to the presence of the high potential plateau which is not reversible. The coulombic efficiencies appear to quickly improve from the first cycle values, around 60-70%, to values higher than 98% within the first five cycles. However, with this regard Li$_2$MnO$_3$ and with x=0.06 are an exception, showing an initial loss in efficiency. When the nickel substitution increases such that x=0.12 a significant improvement in the electrochemical performance is seen, indicating that there is a change in the nature of the charge storage mechanism.

Example 4—Gas Evolution During the First Cycle of the Nickel Substituted Lithium Rich Materials One pellet of each material according to Example 1 was assembled into a Swagelok® test cell specifically machined to carry out an Operando Electrochemical Mass Spectrometry (OEMS) measurement. The mass spectrometry measurement involved in the OEMS experiment was performed with a Thermo-Fisher quadrupolar mass spectrometer. OEMS was performed on the set of materials in order to get an insight on the origin of the extra-capacity that is observed during the first cycle.

Figure 4A:
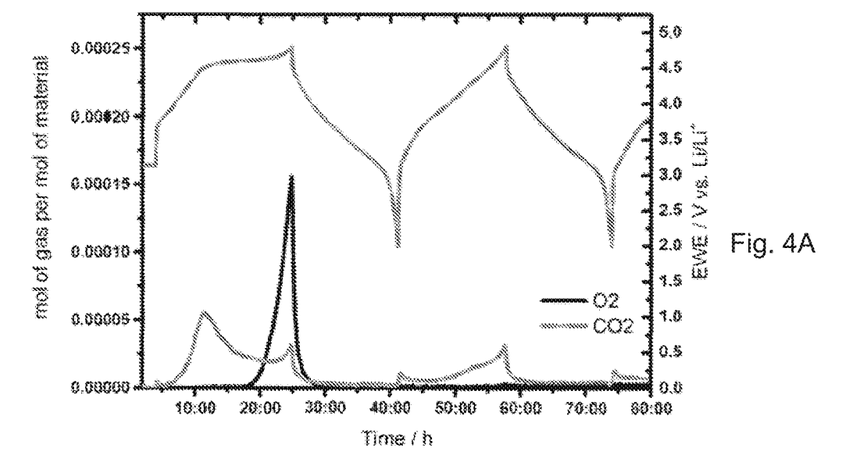
FIGS. 4A-4C show OEMS analysis of a set of the synthesised materials in accordance with Example 1.
Figure 4B:
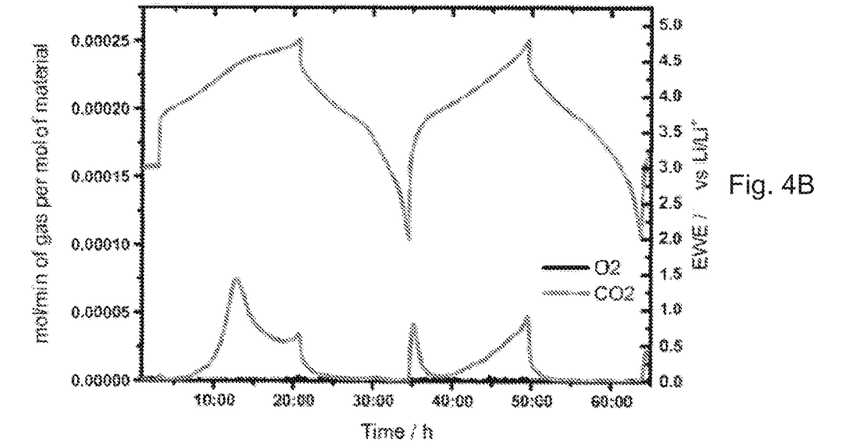
Figure 4C:
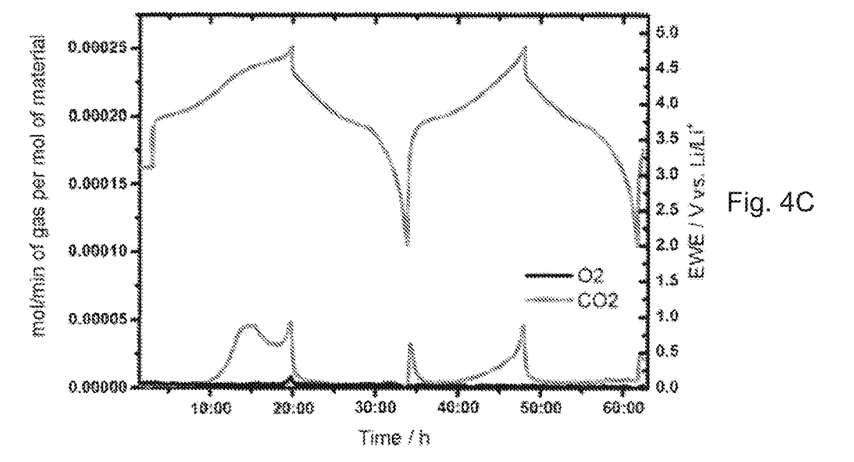

FIG. 4A-4C shows OEMS analysis of the nickel doped for x=0.2, 0.3 and 0.4, respectively. Each graph shows the galvanostatic curve during the first two cycles (top lines in each graph), the oxygen trace, and the carbon dioxide trace for each material. The right y-axis represents the electrode potential while the left y-axis the gas release rate expressed as moles of gas per minute per mole of active material, both axis reported as function of lithium equivalents. Argon was used as carrier gas with a flux rate of 0.7 mL/min and the electrode was cycled against metallic lithium at a rate of 15 mAg$^{-1}$ between 2 and 4.8 V vs. Li$^+$/Li$^0$ for all the materials. The electrolyte employed was a 1M solution of LiPF$_6$ in propylene carbonate.

CO$_2$ and O$_2$ were the only gaseous species detected for all the samples and a clear trend appears from FIG. 4A-4C, with a progressively lower amount of gas released as the amount of dopant nickel increases.

CO$_2$ is detected first in all cases, peaking at the beginning of the high potential plateau (around 4.5 V vs. Li$^+$/Li$^0$) region and progressively decreasing until the end of charge.

The amount of CO$_2$ decreases in line with the increase in nickel in content but is never eliminated. On the other hand, molecular oxygen appears to be released in a spike-like fashion that reaches its maximum towards the end of charge for the materials of the present invention. In the case of the high Ni substitution where x=0.4 it has been shown that there is almost complete suppression of O$_2$ and a strong reduction in the amount of detected CO$_2$ (FIG. 4C). This result is suggestive of the important role played by nickel as in stabilizing the oxide structures at high potentials by reducing the oxygen loss process.

The invention claimed is:

1. An electrode comprising:
   a compound of the general formula:

wherein x is 0.4;
   electroactive additives; and
   a polymeric binder, wherein a mass % of the electrode attributed to the electroactive additives is greater than a mass % of the electrode attributed to the polymeric binder.

2. The electrode of claim 1, wherein the compound is a cathode material having a layered structure.

3. The electrode of claim 2, wherein the layered structure is expressed as the general formula:

wherein a is 0.2.

4. The electrode of claim 1, wherein the electroactive additive is selected from at least one of carbon or carbon black.

5. The electrode of claim 1, wherein the polymeric binder is selected from at least one of PVDF, PTFE, NaCMC or NaAlginate.

6. An electrochemical cell comprising a positive electrode of claim 1, an electrolyte, and a negative electrode.

\* \* \* \* \*